United States Patent
Krampe et al.

(10) Patent No.: US 9,719,507 B2
(45) Date of Patent: Aug. 1, 2017

(54) ROTARY PISTON PUMP HAVING DIRECT DRIVE

(71) Applicant: Hugo Vogelsang Maschinenbau GmbH, Essen (DE)

(72) Inventors: Paul Krampe, Essen/Olbg (DE); Hugo Vogelsang, Löningen/Bunnen (DE)

(73) Assignee: Hugo Vogelsang Maschinenbau GmbH, Essen (DE)

( * ) Notice: Subject to any disclaimer, the term of this patent is extended or adjusted under 35 U.S.C. 154(b) by 0 days.

(21) Appl. No.: 14/439,545

(22) PCT Filed: Oct. 30, 2013

(86) PCT No.: PCT/EP2013/072693
§ 371 (c)(1),
(2) Date: Apr. 29, 2015

(87) PCT Pub. No.: WO2014/067988
PCT Pub. Date: May 8, 2014

(65) Prior Publication Data
US 2015/0275893 A1    Oct. 1, 2015

(30) Foreign Application Priority Data

Oct. 31, 2012    (DE) .................... 20 2012 010 401 U

(51) Int. Cl.
*F04C 2/12*        (2006.01)
*F04C 2/18*        (2006.01)
(Continued)

(52) U.S. Cl.
CPC .................. *F04C 2/18* (2013.01); *F04C 2/08* (2013.01); *F04C 2/084* (2013.01); *F04C 2/12* (2013.01);
(Continued)

(58) Field of Classification Search
CPC ....... Y02E 10/28; Y02E 10/22; F03B 17/061; F04B 49/065; F04B 43/082; F04B 43/1253
(Continued)

(56) References Cited

U.S. PATENT DOCUMENTS 3,184,155 A * 5/1965 Crooks .................. F04C 18/16
                                                              417/338
6,241,486 B1   6/2001 Sloteman
(Continued)

FOREIGN PATENT DOCUMENTS

CN        2364250 Y    2/2000
DE        4330085 A1   3/1995
(Continued)

OTHER PUBLICATIONS

International Patent Application No. PCT/EP2013/072693, International Search Report and Written Opinion dated Sep. 3, 2014.
(Continued)

*Primary Examiner* — Tulsidas C Patel
*Assistant Examiner* — Charles Reid, Jr.
(74) *Attorney, Agent, or Firm* — Kilpatrick Townsend & Stockton LLP; Dean W. Russell; Anthony L. Guebert

(57) ABSTRACT

The invention relates to a rotary lobe pump including a pump housing with a pump chamber, an inlet opening and an outlet opening. A first multi-lobed rotary piston is rotably mounted around a first axis in the pump chamber. A second multi-lobed rotary piston is rotably mounted around a second axis in the pump chamber and meshes with the first rotary piston. The first and second rotary pistons are rotated by a drive unit to create a fluid flow from the inlet opening to the outlet opening. The drive unit includes a first electric
(Continued)

drive motor mechanically coupled with the first rotary piston and a second electric drive motor mechanically coupled with the second rotary piston.

17 Claims, 3 Drawing Sheets

(51) Int. Cl.
    *F04C 2/08*     (2006.01)
    *F04C 15/00*     (2006.01)
    *F04C 2/16*     (2006.01)
    *F04C 13/00*     (2006.01)

(52) U.S. Cl.
    CPC ............... *F04C 2/16* (2013.01); *F04C 13/00* (2013.01); *F04C 15/008* (2013.01); *F04C 2240/402* (2013.01)

(58) Field of Classification Search
    USPC .......................... 290/54, 43; 417/410.4, 53
    See application file for complete search history.

(56) References Cited

U.S. PATENT DOCUMENTS

| | | | | |
|---|---|---|---|---|
| 7,997,885 B2 * | 8/2011 | Allum | ................... | F04C 18/126 418/189 |
| 2009/0185905 A1 * | 7/2009 | Farb | .......................... | F03D 1/04 416/131 |
| 2010/0038910 A1 * | 2/2010 | da Silva | ................ | F03B 13/105 290/52 |
| 2010/0111696 A1 * | 5/2010 | Lyatkher | ............... | F03B 17/063 416/84 |
| 2010/0140935 A1 * | 6/2010 | Paoli | ....................... | F03B 3/103 290/43 |

FOREIGN PATENT DOCUMENTS

| | | | | |
|---|---|---|---|---|
| DE | 19859287 A1 * | 3/2000 | ............ | F04C 15/008 |
| EP | 1519044 A1 | 3/2005 | | |

OTHER PUBLICATIONS

China Patent Application No. 201380068213.1, Office Action and Search Report (and English translation) dated Nov. 17, 2016.

* cited by examiner

ROTARY PISTON PUMP HAVING DIRECT DRIVE

CROSS REFERENCE TO RELATED APPLICATIONS

This application is the U.S. national phase entry of International Application No. PCT/EP2013/072693 filed on Oct. 30, 2013, which application claims priority to German Patent Application No. 20 2012 010 401.2 filed on Oct. 31, 2012, the contents of both of which are incorporated herein by reference.

The invention relates to a rotary lobe pump comprising a pump housing with a pump chamber, an inlet and an outlet opening, a first multi-lobe rotary piston arranged in the pump chamber and rotatably mounted around a first axis and a second multi-lobe rotary piston arranged in the pump chamber which is rotatably mounted around a second axis spaced apart from the first axis and meshes with the first rotary piston, wherein the first and second rotary pistons, by rotating around the first and the second axis respectively, create a fluid flow from the inlet to the outlet opening, a drive unit which is mechanically coupled with the rotary pistons in order to drive the rotary pistons.

Rotary lobe pumps of the aforesaid type are used to convey liquids. The liquids able to be conveyed with the rotary lobe pump can be of a great range of viscosities. In particular, rotary lobe pumps can also be used to convey liquids containing solids.

EP 1519044 B1 describes a rotary lobe pump comprising two shafts on which intermeshing rotary pistons are mounted in a torque-resistant manner. Each shaft is driven by a hydraulic motor. Fundamentally, this type of drive can achieve that the synchronization of the two rotary pistons required for the operation of a rotary lobe pump is generated by the meshing of the two rotary pistons with each other, which allows for each individual rotary piston to be driven directly by the separate hydraulic motor. While during normal operation of such a rotary lobe pump, the torque occurring on each individual rotary piston, averaged out over a longer period of time, is the same for both rotary pistons, an observation of shorter time periods reveals differences in torque between the two rotary pistons when looking at time periods that are shorter than the time required for one full revolution. These torque differences are absorbed by the intermeshing of the two rotary pistons, but with the consequence that wear occurs on the rotary pistons due to their contact with one another and that the strain on the bearings in which the shafts of the rotary pistons are mounted increases as a result. The advantage achieved by the hydraulic direct drive is thereby partially diminished in terms of the efficiency of the rotary lobe pump.

The object of the invention is to provide a rotary lobe pump which can be operated with greater economic efficiency than previously known rotary lobe pumps.

This object is achieved by the first and second rotary piston each comprising a number of N lobes, where N is greater than or equal to two and the lobes of the first and the second rotary piston run helically along the peripheral surface of the rotary piston and in doing so sweep an angle of at least 300° divided by N, preferably 360° divided by N, and in that the drive unit comprises a first electric drive motor which is mechanically coupled with the first rotary piston for driving the first rotary piston and a second electric drive motor which is mechanically coupled with the second rotary piston for driving the second rotary piston.

The rotary lobe pump of the invention on one hand allows for a direct drive by means of electric drives, which leads to an increase in efficiency due to the high efficiency of electric motors. This direct drive is made possible by the lobes of the rotary piston running helically along the peripheral surface of the rotary piston and thereby covering an angular range that is close to a portion of a full revolution corresponding to the fraction of the number of lobes and that is preferably equal to or greater than the corresponding fraction of a full revolution. This spiral course of the lobes of the rotary piston achieves that the torque differences occurring for short periods of time between the two rotary piston are significantly reduced or, in case of a helical course over 360° by N, avoided altogether. In addition to the resulting significant reduction in wear on the rotary pistons due to a theoretically no longer required asynchronization effect produced by the intermeshing of the rotary piston and the thereby reduced strain and forces on the bearings within the rotary lobe pump, this reduction or even avoidance of short-term torque differences enables the use of a direct drive for each rotary piston, which does not need to have the tolerance provided by hydraulic motors for such torque differences and the periodic angle fluctuations associated therewith. Instead, the configuration according to the invention allows for the use of an electric direct drive that can be operated with a high degree of economic efficiency, as it can drive the rotary piston with a practically constant torque and without torque differences between the two rotary pistons. Due to the almost or fully pulsation-free operation and the reduced or fully avoided fluctuations in torque, the increased inertia of a direct-drive electronic motor, which is higher than in a hydraulic motor, can be implemented in the design without this causing a critical threshold load on the connection elements between electric motor and rotary piston.

Another special advantage of the rotary lobe pump of the invention is the almost or completely pulsation-free operation, in which the liquid conveyed by the rotary lobe pump is conveyed in a constant, pulse-free flow. This results in a significant reduction in acceleration and braking processes and in the strain on the bearings of the rotary lobe pump and in the loads on the feed lines connected thereto. While this property of the configuration of the rotary pistons of the rotary lobe pump of the invention allows for, in particular, an electric drive, it must be understood that alternatively in certain types of applications, it is also possible that a hydraulic drive or other form of drive can be used and that this is beneficial and accordingly achieves economic efficiencies in certain cases.

In principle, the drive motors of the rotary lobe pump of the invention can be mechanically coupled with the rotary pistons by means of gearing down or up and, if necessary, through a synchronizing gear, for instance in order to use a drive motor with a particularly high or low rotational speed or in order to use two drive motors with maximum efficiency in different rotational speed ranges and operate them on an alternating basis. However, it is particularly preferred if the first and second drive motor are mechanically coupled directly with the first and second rotary piston, respectively, in particular in that the first drive motor directly drives a first shaft on which the first rotary piston is fixed in a torque-resistant manner and that the second drive motor directly drives a second shaft on which the second rotary piston is fixed in a torque-resistant manner. Through this direct mechanical coupling, which occurs without interpositioning a gear-box such that the rotational speed of the drive motor equals the rotational speed of the rotary piston, the efficiency of the rotary lobe pump is further increased.

It is in particular preferred if the rotary lobe pump is gearless. Such gearless embodiment prevents efficiency losses from being caused by friction in a gear of the rotary lobe pump, in particular a synchronization gear between the two rotary pistons is dispenses with, which is made possible by the configuration according to the invention. Gearless embodiment means here that the rotary pistons of the rotary lobe pump are synchronized with each other solely through their intermeshing, i.e. if one of the two rotary pistons is removed from the rotary piston shaft, both shafts can rotate independently of each other. A further advantage of the gearless embodiment lies in the fact that as a result, the strain on the bearings can be reduced and hence the bearings can be made smaller or, if size is maintained, the bearings can absorb higher pump pressures.

According to a further preferred embodiment, it is provided that at least one of the shafts is mounted rotatably on at least one sliding bearing which is lubricated by means of the conveyed fluid medium, preferably that the first and the second shafts are mounted on sliding bearings lubricated by the conveyed fluid medium. A mounting on sliding bearings lubricated by the conveyed fluid medium itself is generally preferred because of the associated reduction in maintenance costs. In particular, this type of mounting can be beneficial for the pump according to the invention because due to the static, non-pulsating pressure conditions in the interior of the pump, the pressurization of the sliding bearings by the conveyed fluid is a calculable design parameter for the life span of the bearing and the design of the bearings in relation to the forces acting upon them. Moreover, this embodiment allows for an oil-free operation, which is advantageous in particular in the drinking water application which are possible with the rotary lobe pump of the invention. In this case, the use of medium-lubricated ceramic sliding bearings having sufficiently durability and resistance to a variety of conveyed fluids, in particular water, is particularly preferred. A further advantage of using sliding bearings lies in the higher load ratings that can be achieved therewith in the same installation space, allowing the pump to absorb higher pump pressures.

It is particularly preferred if the mechanical synchronization of the rotational movement of the first and second rotary piston occurs through the intermeshing first and second rotary pistons. Thanks to this mechanical synchronization via the intermeshing rotary pistons, a synchronization gear which would be provided separately from the rotary piston, can be omitted, thereby avoiding efficiency losses due to friction inside such a gear. Furthermore, the rotary piston motor according to the invention can be built in a particularly compact and durable manner due to this type of synchronization. Finally, this further embodiment is particularly advantageous when an oil-free operation is desired, since a transmission that possibly requires oil lubrication can be omitted in this case.

In principle, the rotary pistons of the rotary lobe pump according to the invention can preferably have three, four, five, six, seven or more than seven lobes. However, preferred embodiments of the invention provide that each rotary piston has three lobes, with each lobe extending helically over an angle of at least 100°, preferably 120°, or that each rotary piston has four lobes and each lobe extends helically over an angle of at least 75°, preferably 90°, or that each rotary piston has six lobes and that each extends helically over an angle of at least 50°, preferably 60°. With these three further embodiments, a particularly advantageous design is achieved for a pulsation-free operation with little or no torque fluctuations between the two rotary pistons if two, three or four lobes are provided on each rotary piston. In this, it is important to understand that in a normal design, the optimal pulsation reduction and avoidance of torque peaks is achieved at 120°, 90° and 60° respectively for the three, four or six-lobed rotary piston.

Still further, it is preferred that the pump housing limits the pump chamber between the inlet and outlet opening on at least one side with a first inner peripheral wall section and the lobes of the first rotary piston extend helically over an angle which is so large that in any rotational position of the first rotary piston, a contact line between the lobe and the first inner peripheral wall section forms a sealing line between the inlet and outlet opening, and that preferably, the pump housing limits the pump chamber between the inlet and outlet opening with a first and a second inner peripheral wall section and the lobes of the second rotary piston extend helically over an angle which is so small that in any rotational position of the second rotary piston, a contact line between the lobe and the second inner peripheral wall section forms a sealing line between the inlet and outlet opening.

A rotary pump typically pumps the conveyed liquid from the inlet to the outlet opening across two inner peripheral sections typically over-sweeping 180°, in which the conveyed liquid is transported in the spaces between the lobes of the rotary pistons. The intermeshing of the rotary piston causes a displacement of the liquid in the middle between the two rotary piston axes, and consequently no pumping occurs. In order to ensure a secure through-flow through the rotary lobe pumps, i.e. in order to prevent a flow-back from the outlet to the inlet side when the pump stands still, it is preferable that the rotary pistons block the path from the outlet to the inlet opening. If, however, as the invention provides, the lobes are designed to run along a helical line, it may, in certain designs, in particular if the helical line has a only a slight slope, not be possible for a continuous sealing line to be formed by the contact area between the lobe and the inner wall of the pump chamber, which means that a secure through-flow is not ensured. While for an operation with reduced pulsation and optimized in terms of the difference between the torques, it is desirable for the lobes to have a moderate slope, this is not desirable for reasons of through-flow security, so that the reduction in the slope of the lobes is limited by the wrap angle of the inner wall of the housing.

According to this embodiment it is provided that at each position of the rotary piston, a continuous sealing line is achieved across this inner peripheral wall section with the wrap angle predetermined by the housing design. It is important to understand that for an effective pumping by means of the rotary lobe pump it must merely be ensured that between the lobe of a rotary piston and the inner peripheral wall portion between inlet and outlet opening two continuous sealing lines must be formed across the entire length of the pump chamber in at least one rotational position, so that a continuous sealing line is formed in any position of the rotary piston. While for a four-lobed rotary piston with each lobe having a helical course over 90° across the length of the rotary piston, this is achieved if the inner peripheral wall section has a wrap angle of at least 180°, for a three-lobe rotary piston having a helical course over 120°, this can only be achieved with a very small inlet and outlet opening, and for a two-lobe rotary piston having a helical course over 180° it can no longer be achieved at all. Although, in particular in the latter configuration, a complete sealing line of the lobe against the peripheral wall section is achieved in exactly one position, a backwards flow through the pump can occur already if the rotary piston has rotated just a few degrees from this sealing position, as the previously fully formed sealing line is now partially interrupted and the lobe newly entering into contact with the peripheral wall section has built up only a small portion of its sealing line.

Still further, it is preferable that a plurality of rotary pistons are coaxially arranged side-by-side in the pump chamber, wherein said coaxially arranged side-by-side rotary pistons preferably comprise lobes extending in opposite direction to each other. Through such a configuration, the performance of the pump can be increased without foregoing the positive properties with regard to pulsation reduction and prevention of torque differences between the rotary pistons. It is important to understand that each of the rotary pistons which are axially staggered one behind the other, must comprise lobes with a helical course in the previously discussed angular range in order to achieve the advantages according to the invention. The rotary pistons connected to one another in this way can be made in one piece or in several pieces.

Further, it is preferably provided that the pump chamber is arranged between the first and the second electric drive motor. In this arrangement, the electric drive motors are arranged on opposite sides of the pump housing, i.e. the one shaft extends through a left housing cover to its drive motor and the shaft of the other rotary piston extends through a right housing cover to its drive motor. By being arranged in this manner, the drive motors are easily accessible for maintenance purposes and their diameter is not limited by an adjacent arrangement of the two drive motors, thereby allowing for an overall compact design with highly efficient electric drive motors to be achieved.

Finally, it is still further preferred if in a first operating mode, the first and the second drive motor are connected as motor for the conversion of electric energy into flow energy, and in a second operating mode as generator for converting flow energy into electric energy. In this specific embodiment, the rotary lobe pump is used in a first operating mode as a pump for moving a liquid, and accordingly, the rotary pistons are set in rotation by the electric drive motors in this operating mode. In the second operating mode, however, the rotary lobe pump is used as a rotary engine or turbine. In this second operating mode, the rotary pistons are set in rotation by a pressure differential existing between the inlet and outlet opening, and this rotation is transferred through mechanical coupling to the drive motor, which, in this operating mode, works as an electric generator generating electrical energy from this rotation. The possibility of operating in such two operating modes can be especially advantageous in applications where liquid must, on the one hand, be conveyed against a resistance, while on the other hand, it can and should flow back in reverse flow with pressure difference, but is, in particular, to be restricted herein, for example in order to prevent high flow velocities or to reduce the pressure. In this case, the pumping action can be provided by the rotary lobe pump in the first operating mode, and in the second operating mode, the rotary lobe pump is used as a restrictor generating at the same time electrical energy which can optionally be stored temporarily in an internal voltage network, for example in a corresponding accumulator or in a correspondingly dimensioned capacitor, or it can be fed into a public network, thereby improving the economic performance of the user of the rotary pump.

Another aspect of the invention is a hydro-power system, with a rotary piston motor comprising a motor housing having a motor chamber, an inlet and an outlet opening, a first, multi-lobe rotary piston which is arranged in the motor chamber and mounted rotatably about a first axis, and a second multi-lobe rotary piston arranged in the motor chamber which is mounted rotatably about a second axis that is spaced apart from the first axis and intermeshes with the first rotary piston, wherein the first and second rotary piston are set into rotation about the first or, respectively, the second axis by a fluid flow from the inlet to the outlet opening, a generator unit which is mechanically coupled with the rotary pistons in order to be driven by the rotary pistons, in which the first and second rotary pistons each comprise a number of N lobes, wherein N is greater than or equal to two and the lobes of the first and the second rotary piston run helically along the peripheral surface of the rotary piston, thereby sweeping an angle of at least 300° divided by N, preferably 360° divided by N, and the generator unit comprises a first electric generator, which is mechanically coupled with the first rotary piston in order to be driven by the first rotary, and a second electric generator, which is mechanically coupled with the second rotary piston in order to be driven by the second rotary piston.

The so-designed hydro-power system uses the above-explained rotary pump in a constructively and geometrically identical manner, but operates it as a generator or turbine. This means that in the hydro-power system of the invention, the rotary pistons are set into rotation by a pressure difference between inlet and outlet opening, drive and set into rotation, through mechanical coupling, the electric drive motors connected as generators, as a result of which the latter generate electric energy from the pressure difference. Due to their constructive design and the operating characteristics that can be achieved as a result thereof, the rotary pump according to the invention is particularly suitable for use as such a generator. Firstly, the extremely low pulsation operation of the rotary lobe pump allows for the liquid to be supplied through long pipelines even at high pressures, without this causing damage to the pipelines, for instance as a result of possible pulsation, or excessive forces to be applied to the pump due to the inertia of the flowing water. A further advantage is that the rotary lobe pump of the invention can be operated without gears, i.e. losses caused by gears can be completely avoided and thus the efficiency of the hydro-power system can be increased. Finally, it is advantageous that it is possible with the rotary lobe pump of the invention to realize a direct drive of an electric generator from, in each case, one rotary piston, i.e. that in particular in a configuration of the rotary lobe pump with two intermeshing rotary pistons, it is possible accordingly for two electrical generators to be driven directly. This in turn reduces the inertia of the system and any friction losses caused by transferring the rotation via gears, belt drives or the like.

Finally, a further significant advantage of the rotary pump according to the invention is that it allows for an oil-free operation by means of sliding bearings, which are lubricated by the medium in the motor chamber, i.e., in particular, water. This allows for the rotary lobe pump to be used to generate energy from drinking water supply lines without any need for special downstream purification measures or the like.

The hydro-power system according to the invention can be further developed, as explained previously for the rotary lobe pump according to the invention, with the proviso that the pump housing corresponds to the motor housing, the pump chamber to the motor chamber, the drive unit to the generator unit, and the electric drive motor to the electric generator. With these further embodiments, the previously explained advantages of the rotary lobe pump are realized accordingly for the hydro-power system, and with regard thereto, reference is made to the foregoing description of the respective advantages and design variants. Fundamentally, the starting point is a rotary piston machine that can be operated as a rotary lobe pump or a rotary piston motor and accordingly, comprises a machine housing designed as a pump or motor housing, a machine chamber designed as a pump or motor chamber, and a drive unit or generator unit as well as electric drive motors or electric generators.

A method for pumping a liquid with a rotary lobe pump in accordance with the invention is preferably characterized in that the liquid is conveyed through a pump chamber by means of a first and second rotary piston, each comprising a number of N lobes, where N is greater than or equal to two and the lobes of the first and the second rotary piston run helically along the peripheral surface of the rotary piston and in doing so sweep an angle of at least 300° divided by N, preferably 360° divided by N, and in that the first rotary piston is driven by means of a first electric drive motor which is mechanically coupled with the first rotary piston and the second rotary piston is driven by means of a second electric drive motor which is mechanically coupled with the second rotary piston.

A method for generating electric energy from a liquid pressure differential with a rotary lobe pump in the manner according to the invention is preferably characterized in that with the liquid pressure differential, a first rotary piston and a second rotary piston intermeshing with the first rotary piston and the rotary piston motor are driven and accordingly, a first and a second axis are set into rotation, wherein the first and second rotary piston each comprise a number of N lobes, where N is greater than or equal to two and the lobes of the first and the second rotary piston run helically along the peripheral surface of the rotary piston and in doing so sweep an angle of at least 300° divided by N, preferably 360° divided by N, and in that the first rotary piston drives of a first electric generator which is mechanically coupled with the first rotary piston and the second rotary piston drives a second electric generator which is mechanically coupled with the second rotary piston.

Both methods can be developed further in particular by not synchronizing the rotation of the intermeshing rotary pistons of the rotary lobe pump or rotary piston motor by means of a gear.

Preferred embodiments of the invention are explained through the following figures.

Figure 1:
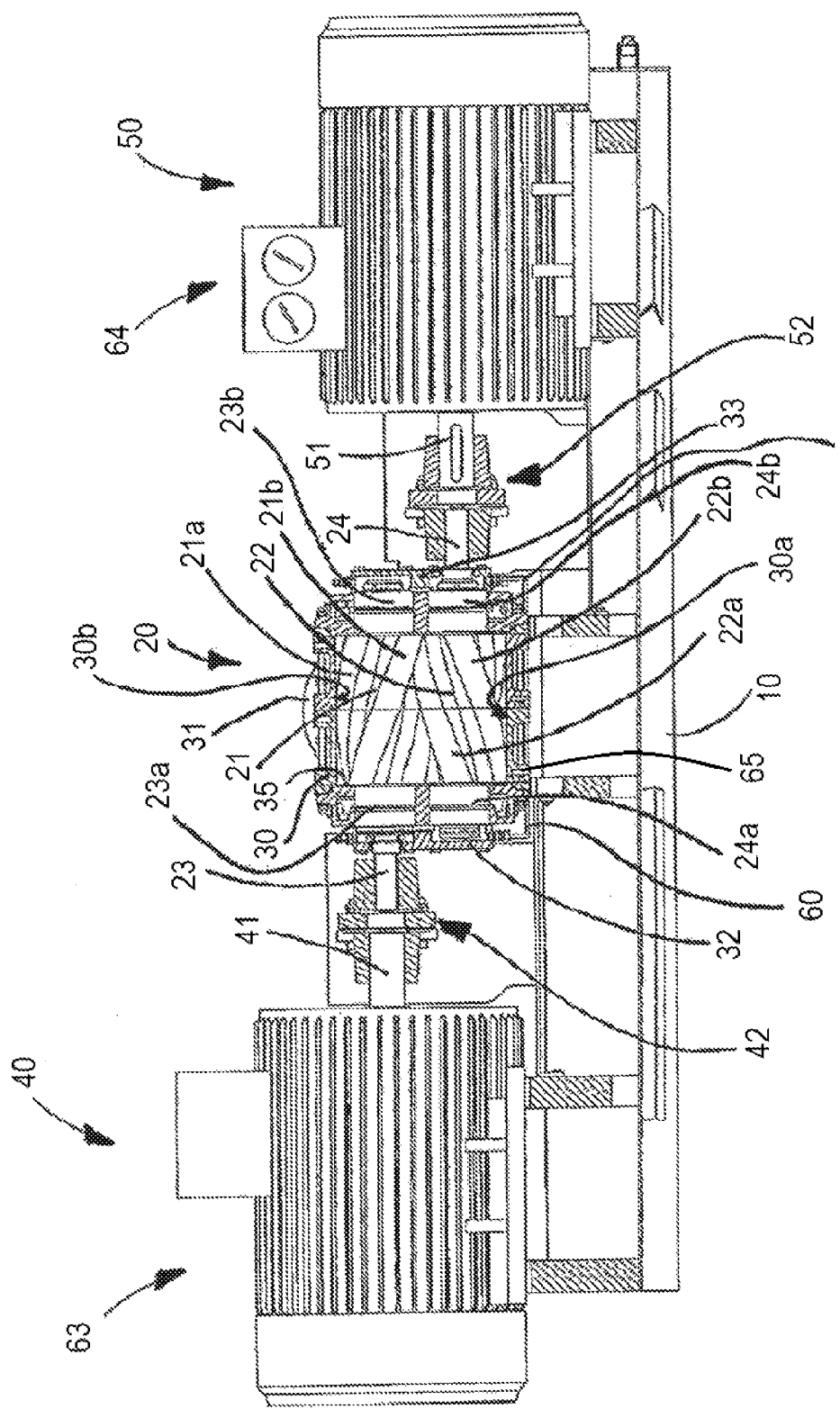
FIG. 1 shows a longitudinal sectional view of a rotary lobe pump according to the invention.

FIG. 1 shows an apparatus that can be operated as a rotary lobe pump or rotary piston motor, consisting of a total of four sub-assemblies: A foundation frame 10, and attached thereon, a housing unit 20, which is flanked by a left electric drive motor 40 and a right electric drive motor 50, both of which are likewise attached to the foundation frame 10.

The drive motors 40, 50 are designed as three-phase motors and can, in a first operating mode, be supplied with electric energy in order to each drive a rotary piston 21, 22 in the rotary lobe pump 20 via a drive shaft 41, 51. In a second operating mode, the drive motors 40, 50 can be operated as generators 63 and 64, respectively. In this second operating mode, a torque is transferred from the rotary piston 21 or 22 via the drive shaft 41, 51 to the generator 63 or 64, and the generator 63 or 64 generates an electric energy that can be stored temporarily or fed into a network.

The housing unit 20 comprises a housing 30 which is constructed in multiple parts. On the housing 30, inlet and outlet openings are arranged which can be connected accordingly by connecting flanges; in FIG. 1, the flange 31 of the outlet opening is visible.

The two rotary pistons 21, 22 are arranged in a pump chamber 35 which is limited on all sides by the pump housing 30 having first and second inner peripheral wall sections 30a, 30b. The rotary pistons 21, 22 are attached to rotary shafts 23, 24 in a torque-resistant manner. In the second operating mode, pump chamber 35 and the pump housing 30 correspond to a motor housing 65.

As can be seen in FIG. 1, both rotary pistons 21, 22 comprise a plurality of lobes 21a/b, 22a/b which interlock with one another in the manner of teeth on two toothed wheels and thus intermesh with one another. Through this intermeshing of the lobes of the rotary pistons, the shafts 23, 24 can, necessarily, only rotate at matching rotational speeds.

The rotary shaft 23 of the upper rotary piston 21 is mounted in a right-side sliding bearing 23a and a left-side slide bearing 23b. Both sliding bearings 23a, b are designed as oil-free bearings and are lubricated by the liquid that is conveyed through the pump chamber. For this purpose, appropriate drainage lines 60, 61 are provided. The drainage line 60 opens into a housing cover 32, the drainage line 61 opens into a housing cover 33 on the right side of the rotary lobe pump.

The rotary shaft 23 extends through the left housing cover 32 to a coupling unit 42, by means of which the rotary shaft 23 is coupled with drive shaft 41 of the drive motor 40 in a torque-resistant manner. The rotary shaft 23 is mounted in the right housing cover 33, but does not extend through this housing cover.

The rotary shaft 24 extends through the right housing cover 33 to a coupling 52, by means of which it is coupled with drive shaft 51 of the drive motor 50 in a torque-resistant manner. This rotary shaft 24 is, in turn, mounted in the right housing cover 33, but does not extend through this housing cover.

As can be seen, the drive motor 40 is coupled directly with the rotary shaft 23 via the coupling 42, driving said rotary shaft or being driven by it in generator mode. Likewise, the drive motor 50 is coupled directly with the rotary shaft 24 via the coupling 52, driving said rotary shaft or being driven by it in generator mode. The rotary lobe pump of the invention according to FIG. 1 does not comprise any step-down or step-up gear or other gearing for synchronizing the rotational movement of the rotary pistons 21, 22.

Figure 2:
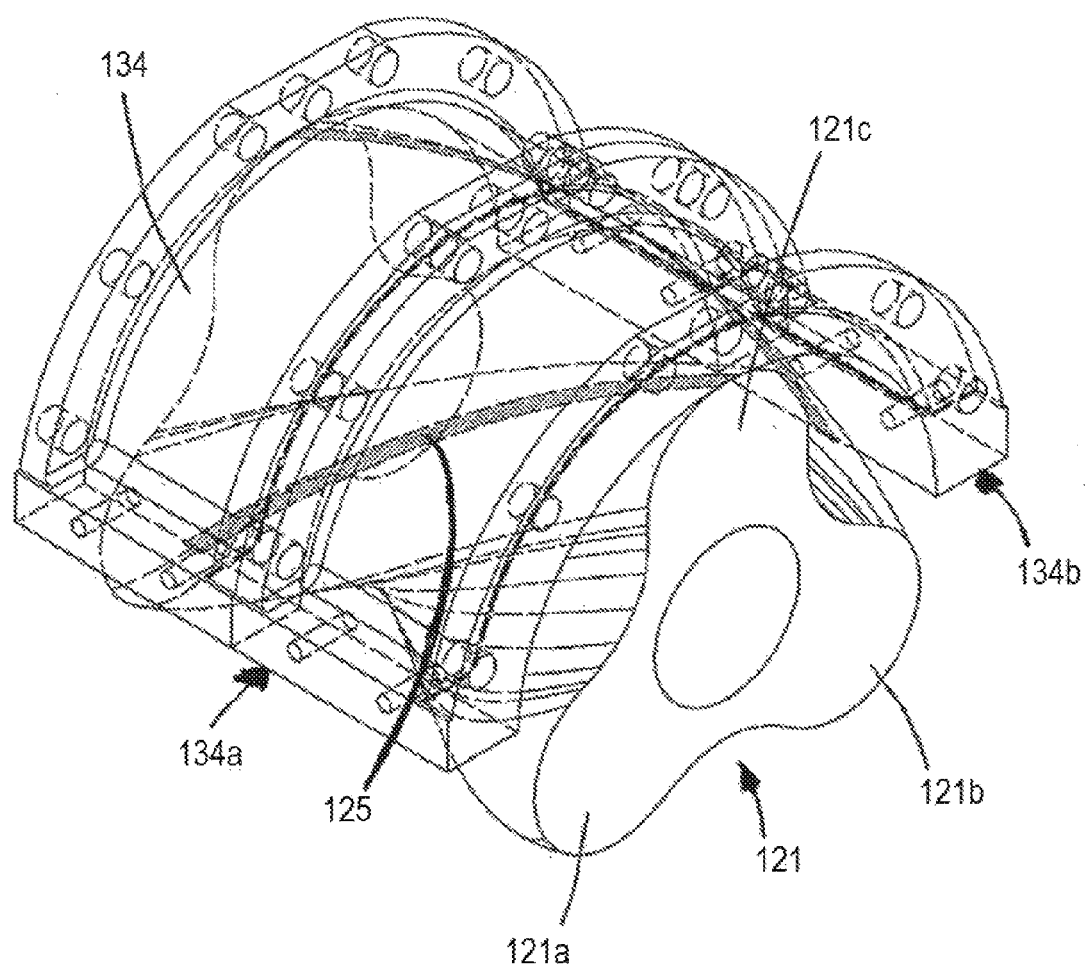
FIG. 2 shows a perspective view of a rotary piston with one half of the housing in a first embodiment.

FIG. 2 shows a three-lobe rotary piston 121 having a total of 3 lobes 121a, b, c. Each of the lobes is wound across the entire axially extending length of the rotary piston over 120° along a helical line. A sealing line 125 is shown as a helical hatched line.

The rotary piston 121 is shown in FIG. 2 in a housing half-shell 134, which defines an upper limiting edge 134a of an inlet opening and an upper limiting edge 134b of an outlet opening.

Figure 3:
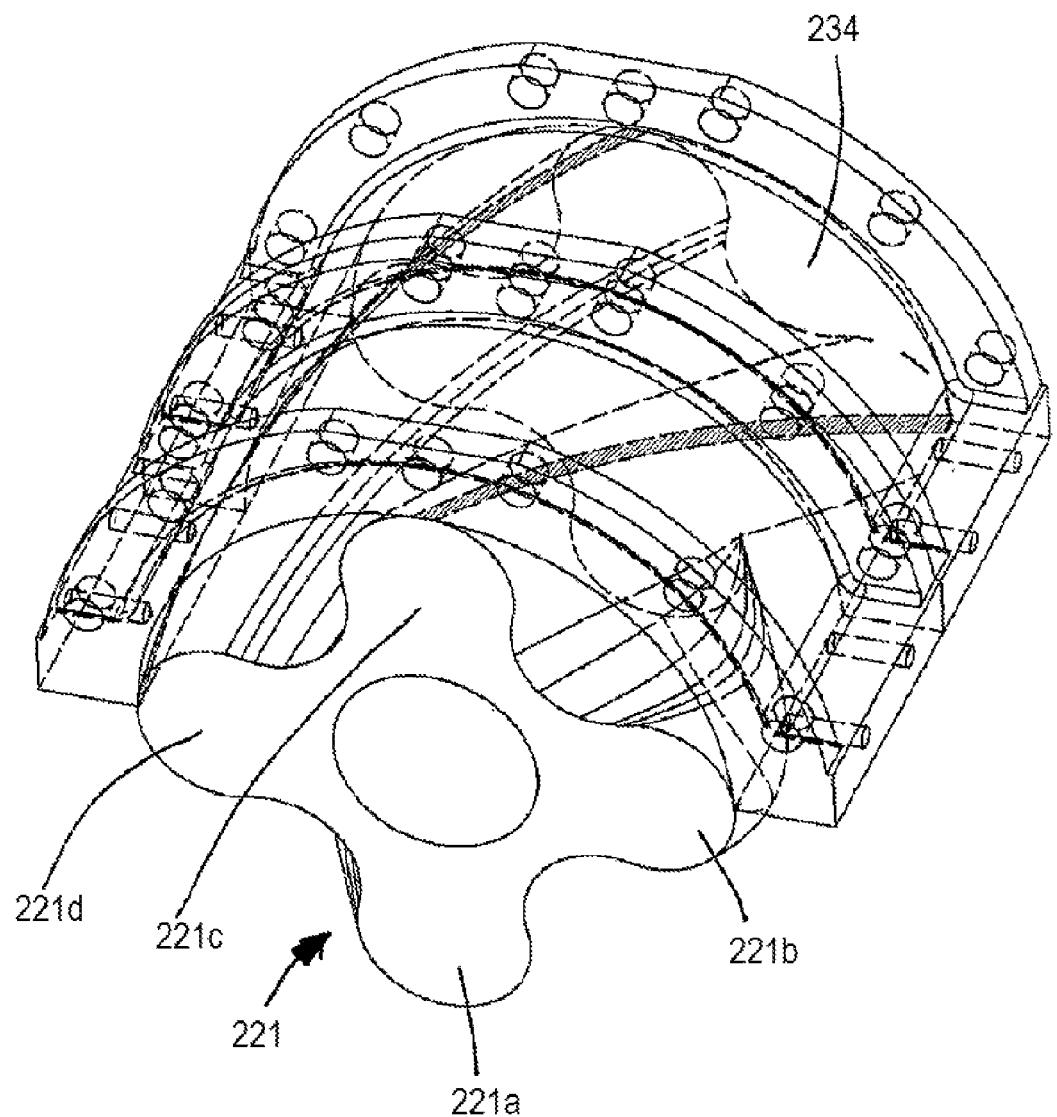
FIG. 3 shows a view according to FIG. 2 with a second embodiment of a rotary piston.

FIG. 3 shows a rotary piston 221 with a total of 4 lobes 221a-d. Each lobe is wound helically along the entire axial length of the rotary piston 221 over a circumferential angle of 90°.

The rotary piston 221 is, in turn, shown in a housing half-shell 234, which corresponds to the housing half-shell 134.

Basically, it is important to understand that during operation, the rotary pistons 121, 221 act together and intermesh with a rotary piston positioned vertically underneath the other. In terms of its number of lobes and the angle over which a lobe extends helically across the length of the rotary piston, this second rotary piston corresponds to the rotary pistons 121 or 221. However, the underlying rotary piston is designed such that the lobe extends in the opposite rotational direction, so that an intermeshing of the two rotary pistons becomes possible.

The invention claimed is:

1. A rotary lobe pump, comprising;
a pump housing with a pump chamber,
an inlet and an outlet opening,
a first multi-lobe rotary piston arranged in the pump chamber and rotatably mounted about a first axis,
a second multi-lobe rotary piston arranged in the pump chamber and rotatably mounted about a second axis that is spaced from the first axis, the second multi-lobe rotary piston intermeshing with the first multi-lobe rotary piston, wherein the first and second multi-lobe rotary pistons generate a fluid flow from the inlet to the outlet opening by rotating around the first and second axis, respectively, and
a drive unit, which is mechanically coupled with the rotary pistons for driving the rotary pistons,
wherein the first and second multi-lobe rotary pistons each comprise a number of N lobes, where N is greater than or equal to two, wherein each one of the lobes of the first and the second rotary multi-lobe pistons comprise a first end and a second end distal from the first end, wherein each one of the lobes extends helically along a peripheral surface of the rotary piston such that the first end is offset from the second end at an angle of at least 300° divided by N, and wherein the drive unit comprises a first electric drive motor that is mechanically coupled with the first multi-lobe rotary piston for driving the first multi-lobe rotary piston and a second electric drive motor that is mechanically coupled with the second multi-lobe rotary piston for driving the second multi-lobe rotary piston.

2. The rotary lobe pump according to claim 1, wherein the first drive motor directly drives a first shaft on which the first multi-lobe rotary piston is fixed in a torque-resistant manner, and wherein the second drive motor directly drives a second shaft on which the second multi-lobe rotary piston is fixed in a torque-resistant manner.

3. The rotary lobe pump according to claim 1, wherein the rotary lobe pump is gearless.

4. The rotary lobe pump according to claim 2, wherein at least one rotary piston is mounted rotatably on at least one sliding bearing that is lubricated by a conveyed fluid medium.

5. The rotary lobe pump according to claim 1, wherein a mechanical synchronization of the rotational movement of the first and second multi-lobe rotary pistons occurs through the intermeshing first and second multi-lobe rotary pistons.

6. The rotary lobe pump according to claim 1, wherein:
each rotary piston has three lobes, each lobe extending helically along the peripheral surface such that the first end of the lobe is offset from the second end of the lobe by an angle of at least 100°, or
each rotary piston has four lobes, each lobe extending helically along the peripheral surface such that the first end of the lobe is offset from the second end of the lobe by an angle of at least 75°, or
each rotary piston has six lobes, each lobe extending helically along the peripheral surface such that the first end of the lobe is offset from the second end of the lobe by an angle of at least 50°.

7. The rotary lobe pump according to claim 1, wherein:
the pump housing limits the pump chamber between the inlet and outlet opening on at least one side by a first inner peripheral wall section, and
the lobes of the first multi-lobe rotary piston extend helically along the peripheral surface such that the angle at which the first end is offset from the second end of each respective lobe is so small that in each rotational position of the first multi-lobe rotary piston, at least one line of contact between the lobe and the first inner peripheral wall section forms a sealing line between the inlet and outlet opening.

8. The rotary lobe pump according to claim 1, wherein the pump chamber is arranged between the first and the second electric drive motor.

9. The rotary lobe pump according to claim 1, wherein the first and the second drive motor are:
in a first operating mode, connected as a motor for the conversion of electric energy into flow energy, and
in a second operating mode, connected as a generator for converting flow energy into electric energy.

10. A hydro-power system with a rotary piston motor, comprising:
a motor housing with a motor chamber,
an inlet and an outlet opening,
a first multi-lobe rotary piston arranged in a pump chamber and rotatably mounted about a first axis,
a second multi-lobe rotary piston arranged in the motor chamber and rotatably mounted about a second axis that is spaced from the first axis, the second multi-lobe rotary piston intermeshing with the first multi-lobe rotary piston,
wherein the first and second multi-lobe rotary pistons are set into rotation about the first and the second axis, respectively, by a fluid flow from the inlet to the outlet opening, and
a generator unit, which is mechanically coupled with the first and second multi-lobe rotary pistons in order to be driven by the first and second multi-lobe rotary pistons,
wherein the first and second multi-lobe rotary pistons each comprises a number of N lobes, where N is greater than or equal to two, wherein each one of the lobes of the first and the second multi-lobe rotary pistons comprise a first end and a second end distal from the first end, wherein each one of the lobes extends helically along a peripheral surface of the rotary piston such that the first end is offset from the second end at an angle of at least 300° divided by N, and wherein the generator unit comprises a first electric generator that is mechanically coupled with the first multi-lobe rotary piston in order to be driven by the first multi-lobe rotary piston and a second electric generator that is mechanically coupled with the second multi-lobe rotary piston in order to be driven by the second multi-lobe rotary piston.

11. A method for pumping a liquid with a rotary lobe pump, wherein the liquid is conveyed through a pump chamber by means of a first and second rotary pistons, each comprising a number of N lobes, where N is greater than or equal to two, wherein each one of the lobes of the first and the second rotary pistons comprise a first end and a second end distal from the first end, wherein each one of the lobes extends helically along a peripheral surface of the rotary piston such that the first end is offset from the second end at an angle of at least 300° divided by N, and wherein the first rotary piston is driven by means of a first electric drive motor that is mechanically coupled with the first rotary piston and the second rotary piston is driven by means of a second electric drive motor which that is mechanically coupled with the second rotary piston.

12. A method for generating electric energy from a liquid pressure differential with a rotary piston motor, wherein with the liquid pressure differential, a first rotary piston and a second rotary piston intermeshing with the first rotary piston and the rotary piston motor are driven and accordingly, a first and a second axis are set into rotation, wherein the first and second rotary pistons each comprise a number of N lobes, where N is greater than or equal to two, wherein each one of the lobes of the first and the second rotary pistons comprise a first end and a second end distal from the first end, wherein each one of the lobes extends helically along a peripheral surface of the rotary piston such that the first end is offset from the second end at an angle of at least 300° divided by N, and in that the first rotary piston drives a first electric generator that is mechanically coupled with the first rotary piston, and the second rotary piston drives a second electric generator that is mechanically coupled with the second rotary piston.

13. The method according to claim 11, wherein the first and the second rotary pistons are intermeshing rotary pistons, and wherein the rotation of the intermeshing rotary pistons of the rotary lobe pump are not synchronized by means of a gear.

14. The rotary lobe pump of claim 4, wherein the first and the second shafts are mounted on sliding bearings lubricated by the conveyed fluid medium.

15. The rotary lobe pump of claim 7, wherein the pump housing limits the pump chamber between inlet and outlet opening with a first and a second inner peripheral wall section, and wherein the lobes of the second rotary piston extend helically over an angle that is so small that in each rotational position of the second rotary piston, at least one line of contact between each lobe and the second inner peripheral wall section forms a sealing line between the inlet and outlet opening.

16. The rotary lobe pump of claim 1, wherein the first multi-lobe rotary piston and the second multi-lobe rotary piston rotate oppositely to each other.

17. The method of claim 12, wherein the first and second rotary pistons are intermeshing rotary pistons and the rotation of the intermeshing rotary pistons of the rotary piston motor are synchronized through the lobes.

* * * * *